United States Patent
Wu

(10) Patent No.: US 10,225,837 B2
(45) Date of Patent: Mar. 5, 2019

(54) DEVICE AND METHOD OF HANDLING HARQ OPERATION FOR UNLICENSED BAND

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 85 days.

(21) Appl. No.: 15/141,810

(22) Filed: Apr. 28, 2016

(65) Prior Publication Data

US 2016/0323883 A1    Nov. 3, 2016

Related U.S. Application Data

(60) Provisional application No. 62/154,135, filed on Apr. 29, 2015.

(51) Int. Cl.
*H04L 1/18* (2006.01)
*H04W 72/04* (2009.01)
(Continued)

(52) U.S. Cl.
CPC ....... *H04W 72/0453* (2013.01); *H04L 1/1812* (2013.01); *H04L 1/1819* (2013.01);
(Continued)

(58) Field of Classification Search
CPC ........... H04W 72/0453; H04W 76/046; H04W 72/042; H04W 72/0413; H04W 28/14;
(Continued)

(56) References Cited

U.S. PATENT DOCUMENTS 8,897,149 B2 * 11/2014 Wiemann .............. H04L 1/1874
    370/235
9,203,562 B2 * 12/2015 Chen .................... H04L 1/1851
    (Continued)

FOREIGN PATENT DOCUMENTS

EP      2637469 A1 * 9/2013   ........... H04L 1/1877
WO  2005125109 A2   12/2005
    (Continued)

OTHER PUBLICATIONS

3GPP TS 36.300 V12.5.0 (Mar. 2015) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).
(Continued)

*Primary Examiner* — Lan-Huong Truong
(74) *Attorney, Agent, or Firm* — Winston Hsu

(57) ABSTRACT

A communication device configured with an asynchronous hybrid automatic repeat request (HARQ) operation for a first cell of a network comprises a storage unit for storing instructions and a processing means coupled to the storage unit. The processing means is configured to execute the instructions stored in the storage unit. The instructions comprise transmitting a first plurality of uplink (UL) transmissions of a data block in a first HARQ buffer associated with a first HARQ process on the first cell to the network by using the asynchronous HARQ operation; and stopping maintaining a first counter for counting a number of the first plurality of UL transmissions, when using the asynchronous HARQ operation.

16 Claims, 3 Drawing Sheets

(51) Int. Cl.
*H04W 76/27* (2018.01)
*H04W 28/14* (2009.01)

(52) U.S. Cl.
CPC .......... *H04L 1/1822* (2013.01); *H04L 1/1896* (2013.01); *H04W 28/14* (2013.01); *H04W 72/042* (2013.01); *H04W 72/0413* (2013.01); *H04W 76/27* (2018.02)

(58) Field of Classification Search
CPC ... H04L 1/1812; H04L 1/1819; H04L 1/1896; H04L 1/1822
See application file for complete search history.

(56) References Cited

U.S. PATENT DOCUMENTS

| | | | | |
|---|---|---|---|---|
| 2010/0208677 A1* | 8/2010 | Ahn | .................. | H04W 72/1257 370/329 |
| 2010/0257419 A1* | 10/2010 | Sung | .................. | G06F 11/1443 714/748 |
| 2012/0040715 A1* | 2/2012 | Fu | ........................ | H04B 1/1027 455/553.1 |
| 2013/0051269 A1* | 2/2013 | Suzuki | ................. | H04L 1/1812 370/252 |
| 2014/0133454 A1* | 5/2014 | Chan | ....................... | H04L 69/04 370/331 |
| 2015/0016318 A1* | 1/2015 | Lee | .......................... | H04L 5/14 370/280 |
| 2015/0043481 A1* | 2/2015 | Mucke | ................. | H04L 1/1854 370/329 |
| 2015/0085711 A1* | 3/2015 | Wang | ....................... | H04L 5/14 370/280 |
| 2015/0110027 A1* | 4/2015 | Lim | ...................... | H04L 1/1812 370/329 |
| 2015/0156763 A1* | 6/2015 | Seo | ........................ | H04L 1/1854 370/329 |
| 2016/0174259 A1* | 6/2016 | Mukherjee | ........... | H04L 1/1816 370/280 |
| 2016/0227455 A1* | 8/2016 | Lei | ....................... | H04W 36/08 |

FOREIGN PATENT DOCUMENTS

| | | | | |
|---|---|---|---|---|
| WO | WO 2005125109 A2 * | 12/2005 | .......... | H04L 1/0003 |
| WO | 2007148945 A2 | 12/2007 | | |
| WO | 2008115134 A2 | 9/2008 | | |

OTHER PUBLICATIONS

3GPP TS 36.321 V12.5.0 (Mar. 2015) Technical Specification 3rd Generation Partnership Project; Technical Specification Group Radio Access Network; Evolved Universal Terrestrial Radio Access (E-UTRA); Medium Access Control (MAC) protocol specification (Release 12).

3GPP TS 36.331 V12.5.0 (Mar. 2015) Technical Specification 3rd Generation Partnership Project; Technical Specification Group Radio Access Network; Evolved Universal Terrestrial Radio Access (E-UTRA); Radio Resource Control (RRC); Protocol specification (Release 12).

Search Report dated Oct. 24, 2016 for EP application No. 16167697.8, pp. 1-8.

* cited by examiner

DEVICE AND METHOD OF HANDLING HARQ OPERATION FOR UNLICENSED BAND

CROSS REFERENCE TO RELATED APPLICATIONS

This application claims the benefit of U.S. Provisional Application No. 62/154,135, filed on Apr. 29, 2015, which is incorporated herein by reference.

BACKGROUND OF THE INVENTION

1. Field of the Invention

The present invention relates to a device and a method used in a wireless communication system, and more particularly, to a device and a method of handling a hybrid automatic repeat request (HARQ) operation for an unlicensed band in a wireless communication system.

2. Description of the Prior Art

A long-term evolution (LTE) system provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system is an evolution of the LTE system. The LTE-A system extends cell coverage of an eNB, increases peak data rate and throughput, and includes advanced techniques, such as carrier aggregation (CA), licensed-assisted access (LAA) using LTE, etc.

The eNB may communicate with the UE via an unlicensed band. However, resource in the unlicensed band is not always available due to that a channel is being used (i.e., channel busy). Operation rules designed for a licensed band may not be operated regularly in the unlicensed band. For example, a timing of a retransmission in the unlicensed band is not predetermined due to the channel busy. For another example, a UE may flush a hybrid automatic repeat request (HARQ) buffer for the retransmission, while the eNB does not know that the HARQ buffer of the UE is flushed. The eNB may request the UE to perform the retransmission associated with the flushed HARQ buffer. In this situation, the retransmission is failed since data in the flashed HARQ buffer is cleared.

Thus, how to handle a HARQ operation for (e.g., related to or in) the unlicensed band is an important problem to be solved.

SUMMARY OF THE INVENTION

The present invention therefore provides a communication device and method for handling a HARQ operation for an unlicensed band to solve the abovementioned problem.

A communication device configured with an asynchronous hybrid automatic repeat request (HARQ) operation for a first cell of a network comprises a storage unit for storing instructions and a processing means coupled to the storage unit. The processing means is configured to execute the instructions stored in the storage unit. The instructions comprise transmitting a first plurality of uplink (UL) transmissions of a data block in a first HARQ buffer associated with a first HARQ process on the first cell to the network by using the asynchronous HARQ operation; and stopping maintaining a first counter for counting a number of the first plurality of UL transmissions, when using the asynchronous HARQ operation.

A method for a communication device configured with an asynchronous hybrid automatic repeat request (HARQ) operation for a first cell of a network comprises transmitting a first plurality of uplink (UL) transmissions of a data block in a first HARQ buffer associated with a first HARQ process on the first cell to the network by using the asynchronous HARQ operation; and stopping maintaining a first counter for counting a number of the first plurality of UL transmissions, when using the asynchronous HARQ operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
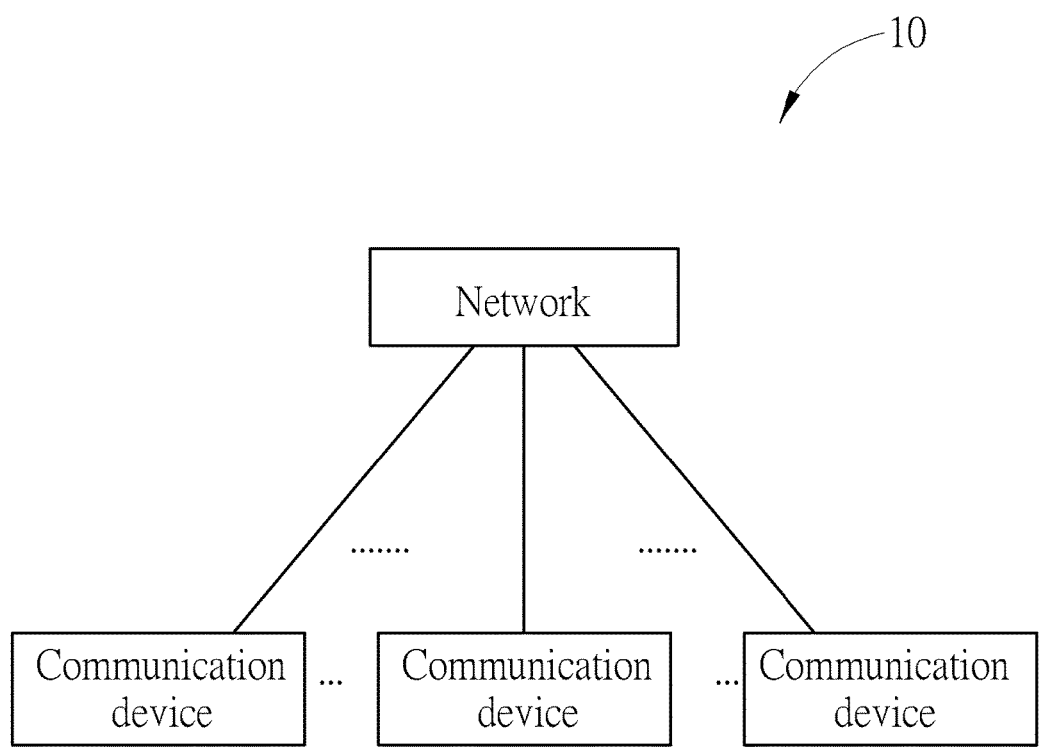
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. The network and a communication device may communicate with each other via one or more carriers of licensed band (s) and/or unlicensed band (s). The network and the communication device may simultaneously communicate with each other via multiple cells (e.g., multiple carriers) including a primary cell (e.g., primary component carrier (CC)) and one or more secondary cells (e.g., secondary component carriers). The abovementioned cells may be operated in the same or different duplexing modes, i.e. frequency-division duplexing (FDD) and time-division duplexing (TDD). For example, the primary cell may be operated on licensed carrier(s), while the secondary cell may be operated on unlicensed carrier(s).

In FIG. 1, the network and the communication devices are simply utilized for illustrating the structure of the wireless communication system 10. Practically, the network can be a universal terrestrial radio access network (UTRAN) comprising at least one Node-B (NB) in a universal mobile telecommunications system (UMTS). The UTRAN may include a Radio Network Controller (RNC). In another example, the network may be an evolved UTRAN (E-UTRAN) including at least one evolved NB (eNB) and/or at least one relay in a long term evolution (LTE) system, a LTE-Advanced (LTE-A) system or an evolution of the LTE-A system. The network may be a fifth generation (5G) network including at least one 5G base station (BS) which employs orthogonal frequency-division multiplexing (OFDM) and/or non-OFDM for communication with the communication devices. In general, a base station (BS) may also be used to refer any of the NB, the RNC, the eNB and the 5G BS.

A communication device may be a user equipment (UE), a machine type communication (MTC) device, a mobile phone, a laptop, a tablet computer, an electronic book, a portable computer system, a vehicle, an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
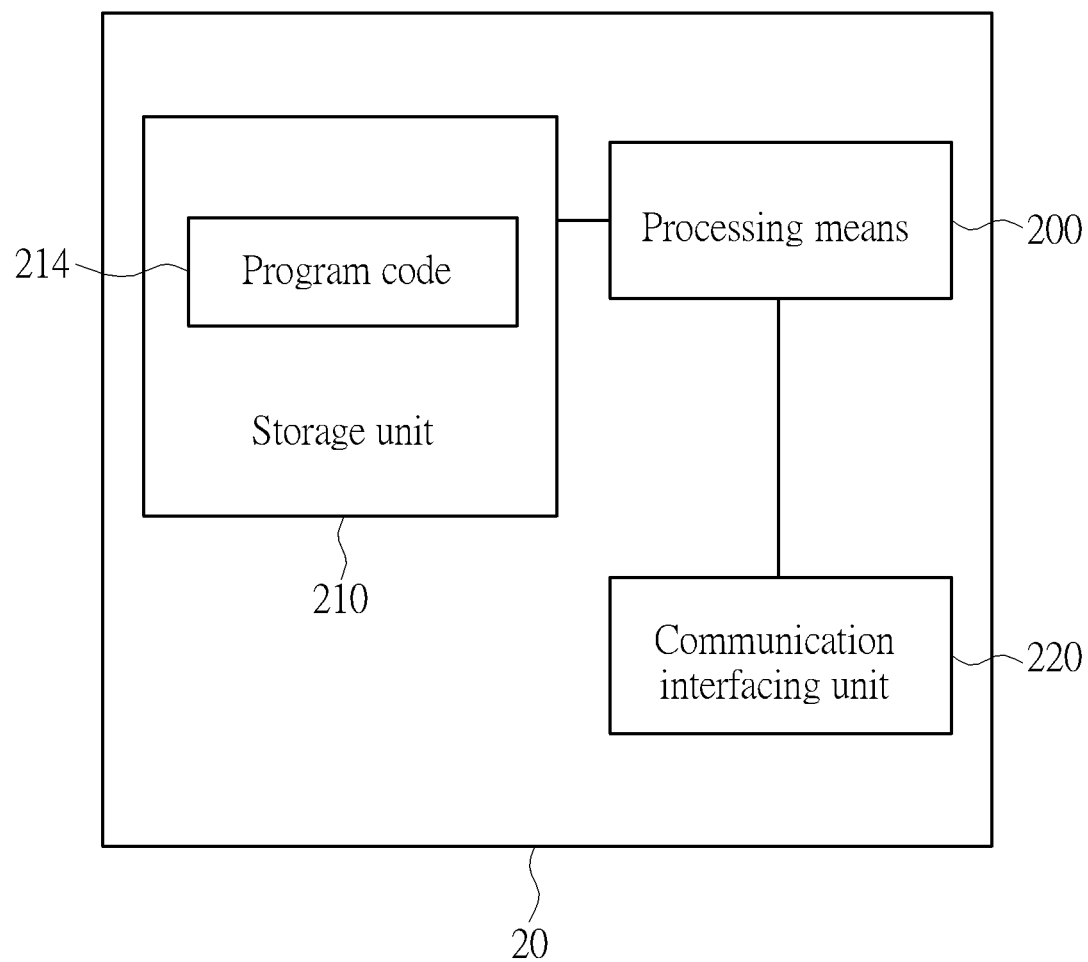
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing means 200.

In the following embodiments, a UE is used to represent a communication device in FIG. 1 to simplify the illustration of the embodiments.

Figure 3:
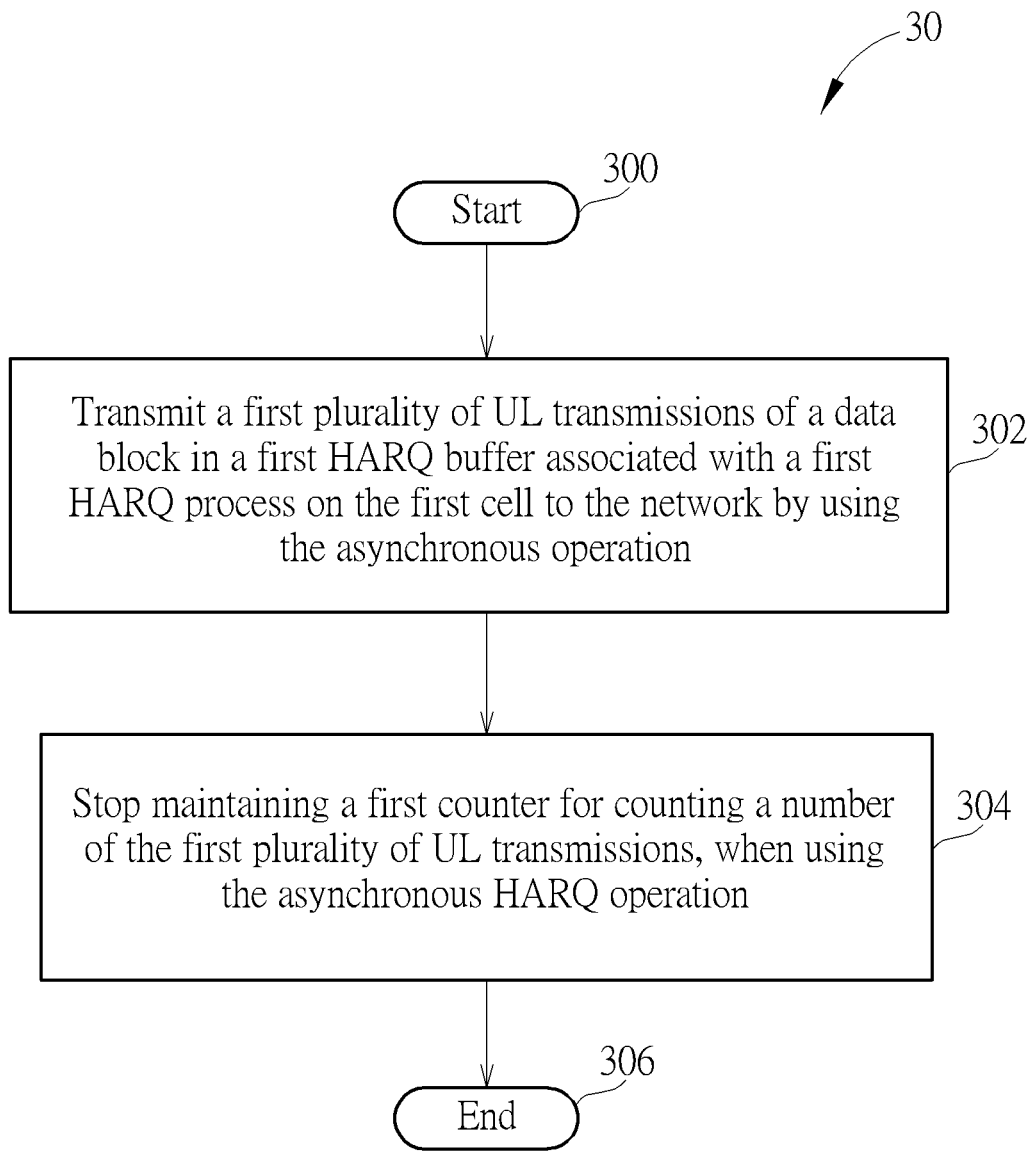
FIG. 3 is a flowchart of a process according to an example of the present invention.

FIG. 3 is a flowchart of a process 30 according to an example of the present invention. The process 30 may be utilized in a UE configured with an asynchronous (i.e., adaptive) hybrid automatic repeat request (HARQ) operation (e.g., HARQ process) for a first cell of the network. The process 30 may be compiled into the program code 214 and includes the following steps:

Step 300: Start.

Step 302: Transmit a first plurality of UL transmissions of a data block in a first HARQ buffer associated with a first HARQ process on the first cell to the network by using the asynchronous HARQ operation.

Step 304: Stop maintaining a first counter for counting a number of the first plurality of UL transmissions, when using the asynchronous HARQ operation.

Step 306: End.

According to the process 30, the UE may transmit a first plurality of UL transmissions of a data block (e.g., medium assess control (MAC) protocol data unit) in a first HARQ buffer associated with a first HARQ process on the first cell to the network by using the asynchronous HARQ operation. Then, the UE may stop maintaining a first counter (e.g., CURRENT_TX_NB) for counting a number of the first plurality of UL transmissions, when using the asynchronous HARQ operation. That is, the UE stops maintaining the first counter (i.e., stops counting or not counting) to avoid flushing the first HARQ buffer of the first HARQ process, when using the asynchronous HARQ operation. The problem that the UE fails to perform a retransmission due to the data block in the HARQ buffer flushed is solved. Note that the first plurality of UL transmissions may include a new transmission and a retransmission, or may include the retransmission only. The network may transmit a DL control information (DCI) in a control channel on either of the first cell or another cell to the UE to schedule each of the first plurality of UL transmissions. Each of DCIs for the first plurality of UL transmissions includes a HARQ process number which identifies the first HARQ process. The UE uses the HARQ process number to identify the HARQ process.

An example is illustrated as follows. The UE transmits a UL transmission of a data block in a HARQ buffer on a cell to the network. The network does not receive the UL transmission so the network schedules a UL retransmission of the data block to the UE via a control channel. The UL transmission and the retransmission are associated with a HARQ process of the UE. The UL transmission may be a new transmission or a retransmission. The control channel may include a physical DL control channel (PDCCH) and/or an enhanced PDCCH (EPDCCH) on the cell or another cell. The network may transmit a DCI in the control channel to the UE for each of the UL transmission and the retransmission. The DCI includes a HARQ process number which identifies the HARQ process of the UE, and may further include information indicating a modulation and coding scheme (MCS). The UE may transmit the UL retransmission according to the DCI received in the control channel instead of a physical HARQ indicator channel (PHICH). Thus, the eNB does not need to transmit the PHICH to the UE to acknowledge the UL transmission and the retransmission, and the UE does not need to decode the PHICH. According to the process 30, the UE does not flush the HARQ buffer of the HARQ process even when the UE has retransmitted a transmission of the HARQ process for a maximum number of times (e.g., "maximum number of transmissions—1").

In one example, each of the DCIs scheduling the first plurality of UL transmissions may include a redundancy version (RV). The UE may transmit each of the first plurality of UL transmissions on the first cell according to the RV in the DCI received in the control channel on either of the first cell or another cell. In other words, the UE use the RV in the DCI instead of the predetermined sequence. For example, the UE may not need to maintain a variable "CURRENT_IRV" which is an index in a sequence of RVs "0, 2, 3, 1". Alternatively, the UE may set CURRENT_IRV to the RV received in the DCI instead of following the sequence of RVs "0, 2, 3, 1". In another example of the asynchronous operation, the UE may transmit a transmission on the first cell according to the predetermined sequence, and a DCI for the transmission does not include a RV.

Realization of the process 30 is not limited to the above description.

In one example, the UE may perform a synchronous HARQ operation on a second cell of the network while performing the asynchronous operation on the first cell. The UE transmits a second plurality of UL transmissions of a data block in a second HARQ buffer associated with a second HARQ process on the second cell to the network. The UE may maintain a second counter (e.g., CURRENT_TX_NB) for counting a number of the second plurality of UL transmissions, when performing the synchronous HARQ operation on the second cell. When a value of the second counter reaches a maximum number of transmissions, the UE flushes the second HARQ buffer. The first cell and the second cell may be operated in a same band or different bands, wherein each of the band(s) may be a licensed band or an unlicensed band. For example, the first serving cell may be operated in the unlicensed band, while the second cell may be operated in the licensed band. Further, in the synchronous HARQ operation, the UE may transmit the second plurality of UL transmissions according to a predetermined sequence of RVs. For example, the predetermined sequence may be "0, 2, 3, 1". That is, RV 0 is used for a first transmission (new transmission) of the second plurality of UL transmissions, RV 2 is used for a second transmission (retransmission) of the second plurality of UL transmissions, RV 3 is used for a third transmission (retransmission) of the second plurality of UL transmissions, and RV 1 is used for a fourth transmission (retransmission) of the second plurality of UL transmissions. The network may transmit a DCI to the UE for each of the second plurality of UL transmissions. The DCI does not include a HARQ process number which identifies the second HARQ process.

According to the above description, the UE may determine to maintain a counter (e.g., CURRENT_TX_NB) for a HARQ process when the UE applies the synchronous HARQ operation to the HARQ process, and may determine not to maintain the counter for the HARQ process when the UE applies the asynchronous HARQ operation to the HARQ process. In other words, the UE may flush a HARQ buffer of a HARQ process after a maximum number of transmissions of a first data block in the HARQ buffer, when the UE applies the synchronous HARQ operation to the HARQ process, and may not flush the HARQ buffer of the HARQ process after the maximum number of transmissions of a second data block in the HARQ buffer when the UE applies the asynchronous HARQ operation to the HARQ process.

The UE and the network may use the asynchronous HARQ operation on a cell when the cell is operated on the unlicensed band/spectrum, and use the synchronous operation on the cell when the cell is operated on the licensed band/spectrum. Alternatively, the network may configure the UE to use the synchronous operation or the asynchronous operation on the cell.

In one example, the UE may be configured with a radio resource control (RRC) connection by the network to a third cell of the network, before being configured with the asynchronous HARQ operation on the first cell. The third cell may be the second cell or another cell other than the second cell. In one example, the UE may receive on the RRC connection a RRC message (e.g., RRCConnectionReconfiguration) including a field or an information element for configuring the synchronous operation or the asynchronous HARQ operation on a cell to the UE.

It should be noted that any of the first cell, the second cell or the third cell mentioned above may be a primary cell or a secondary cell, and is not limited herein.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

To sum up, the present invention provides a communication device and method of determining whether maintaining a counter for a HARQ process on a cell according to a synchronous operation or an asynchronous operation. The present invention also provides a communication device and method of determining whether flushing a HARQ buffer of a HARQ process on a cell according to the synchronous operation or the asynchronous operation.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A communication device configured with an asynchronous hybrid automatic repeat request (HARQ) operation for a first cell of a network, comprising:
    a storage unit, for storing instructions of:
       transmitting a first plurality of uplink (UL) transmissions of a data block in a first HARQ buffer associated with a first HARQ process on the first cell to the network by using the asynchronous HARQ operation; and
       not using a counter CURRENT_TX_NB, to not flush the first HARQ buffer, when using the asynchronous HARQ operation for the first HARQ process; and
    a processing means, coupled to the storage unit, configured to execute the instructions stored in the storage unit.

2. The communication device of claim 1, wherein the first cell is operated in an unlicensed band.

3. The communication device of claim 1, wherein the communication device performs a synchronous HARQ operation on a second cell of the network, and the storage unit further stores instructions of:
    transmitting a second plurality of UL transmissions of a data block in a second HARQ buffer associated with a second HARQ process on the second cell to the network; and
    using the counter CURRENT_TX_NB, when performing the synchronous HARQ operation on the second cell.

4. The communication device of claim 3, wherein the communication device receives a radio resource control (RRC) message comprising a field or an information element for configuring the synchronous HARQ operation to the communication device.

5. The communication device of claim 3, wherein the instruction of transmitting the second plurality of UL transmissions of the data block in the second HARQ buffer associated with the second HARQ process on the second cell to the network comprises:
    transmitting the second plurality of UL transmissions of the data block in the second HARQ buffer associated with the second HARQ process on the second cell to the network according to a predetermined sequence of redundancy versions (RVs).

6. The communication device of claim 1, wherein the communication device is configured with a RRC connection by the network to a third cell of the network, before being configured with the asynchronous HARQ operation on the first cell.

7. The communication device of claim 1, wherein the communication device receives a RRC message comprising a field or an information element for configuring the asynchronous HARQ operation to the communication device.

8. The communication device of claim 1, wherein the instruction of transmitting the first plurality of UL transmissions of the data block in the first HARQ buffer associated with the first HARQ process on the first cell to the network by using the asynchronous operation comprises:
    transmitting each of the first plurality of UL transmissions of the data block in the first HARQ buffer associated with the first HARQ process on the first cell to the network according to a RV of a downlink (DL) control information (DCI) received in a control channel on either of the first cell or another cell.

9. A method for a communication device configured with an asynchronous hybrid automatic repeat request (HARQ) operation for a first cell of a network, comprising:
transmitting a first plurality of uplink (UL) transmissions of a data block in a first HARQ buffer associated with a first HARQ process on the first cell to the network by using the asynchronous HARQ operation; and
not using a counter CURRENT_TX_NB, to not flush the first HARQ buffer, when using the asynchronous HARQ operation for the first HARQ process.

10. The method of claim 9, wherein the first cell is operated in an unlicensed band.

11. The method of claim 9, wherein the communication device performs a synchronous HARQ operation on a second cell of the network, and the method further comprises:
transmitting a second plurality of UL transmissions of a data block in a second HARQ buffer associated with a second HARQ process on the second cell to the network; and
using the counter CURRENT_TX_NB, when performing the synchronous HARQ operation on the second cell.

12. The method of claim 11, wherein the communication device receives a radio resource control (RRC) message comprising a field or an information element for configuring the synchronous HARQ operation to the communication device.

13. The method of claim 11, wherein the step of transmitting the second plurality of UL transmissions of the data block in the second HARQ buffer associated with the second HARQ process on the second cell to the network comprises:
transmitting the second plurality of UL transmissions of the data block in the second HARQ buffer associated with the second HARQ process on the second cell to the network according to a predetermined sequence of redundancy versions (RVs).

14. The method of claim 9, wherein the communication device is configured with a RRC connection by the network to a third cell of the network, before being configured with the asynchronous HARQ operation on the first cell.

15. The method of claim 9, wherein the communication device receives a RRC message comprising a field or an information element for configuring the asynchronous HARQ operation to the communication device.

16. The method of claim 9, wherein the step of transmitting the first plurality of UL transmissions of the data block in the first HARQ buffer associated with the first HARQ process on the first cell to the network by using the asynchronous operation comprises:
transmitting each of the first plurality of UL transmissions of the data block in the first HARQ buffer associated with the first HARQ process on the first cell to the network according to a RV of a downlink (DL) control information (DCI) received in a control channel on either of the first cell or another cell.

* * * * *